United States Patent Office 2,700,617
Patented Jan. 25, 1955

2,700,617

ACETYL CELLULOSE PLASTICIZED WITH AN ALKYLBENZOL-SULFAMIDE

Konrad Henkel, Dusseldorf, Wolfgang Gündel, Dusseldorf-Oberkassel, and Alfred Kirstahler, Dusseldorf, Germany, assignors to Henkel & Cie. G. m. b. H., Dusseldorf-Holthausen, Germany No Drawing. Application April 14, 1951,
Serial No. 221,114

2 Claims. (Cl. 106—186)

The object of this invention is a composition of matter comprising acetyl cellulose and an alkyl benzol-sulfonamide.

It is a fact known in the art that amides of the sulfonic acids of benzol, toluol, and xylol are compatible with acetyl cellulose and have been suggested and also used as softeners for cellulose esters of this kind.

These aromatic sulfamides are all solid, well crystallizing compositions which in part have very high melting points. There is a tendency, however, despite the good compatability, to crystallize out of the film. The products referred to have therefore mostly been used in the form of eutectic mixtures with low crystallization point, but the disadvantage was not decisively eliminated in this manner.

It proved more effective, although in part at the expense of the good compatability, to replace the aromatic sulfamides by their N-alkyl derivatives as the melting points of the latter are considerably lower. It was possible, by suitable mixtures of different N-alkylaryl-sulfamides, to manufacture liquid products, which, while possessing sufficient compatibility with acetyl cellulose, in part did not solidify even at temperatures under 0° C.

The N-N-dialkylamides of organic sulfonic acids serve no purpose as the melting points are higher than those of the corresponding N-mono-alkyl derivatives, and especially because the compatability with film-formers, in particular with acetyl cellulose, is further reduced, and, already in the case of alkyl radicals of more than 2 C-atoms quickly sinks below the allowable (cf. Ind. and Eng. Chem. 1947, p. 1082).

The disadvantages pointed out above have been overcome by the new plasticizing and gelatinizing products developed by the inventors.

The inventors have found that mixtures of alkylbenzol-sulfamides with one or more ring bound alkyl radicals of a total of 6–16 carbon atoms possess good compatibility with acetyl celluloses dissolvable in acetone and when added in the usual quantities as softeners produce clear, dry and solid acetyl-cellulose films with excellent properties.

These compositions are obtained in the well known manner by chlorosulfonization of suitable alkyl benzols and a treatment of the reaction product with ammonia. The alkyl-aryl sulfon-amides obtained, and to be used according to the present invention, are highly viscous liquids which do not crystallize even at temperatures under 0° C. and can be processed in acetyl cellulose in amounts in excess of 200% without obtaining sticky films. It was quite unexpected that arylsulfamides with long alkyl radicals of fatty character can be successfully combined with acetyl cellulose and produce non-sweating, waterproof films of good surface hardness.

The inventors are aware of the fact that products of the kind referred to above have been suggested as plasticizers for superpolyamides in U. S. Patent No. 2,276,437.

This fact, however, offers no indication of the valuable qualities discovered by the inventors of alkylbenzol-sulfamides with alkyl radicals of 6–16 C-atoms as softeners in connection with acetyl cellulose, in view of the basic difference between acetylcellulose and superpolyamides.

The alkylbenzolsulfamides to be used as plasticizers for acetylcellulose according to this invention are of the general formula

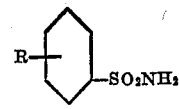

The amide group in this compound is not substituted. The ring-bound radical R represents a straight or branched alkyl group, or also a cycloalkyl group, e. g. the cyclohexyl group.

The plasticizers according to this invention are used in the known manner either by themselves or in connection with other known softeners for acetyl cellulose as for instance poly-glycerol acetate, di-methyl-phthalate, di-oxethyl-phthalate, di-butyl-tartrate, tributyl-citrate, methylphthalyl-ethyl-glycolate, N-isopropyl-benzene-sulfamide, tri-butoxyethyl-phosphate a. s. o.

Example

A mixture of alkylbenzols with alkyl groups of 8–14 carbon atoms is obtained from a mixture of monochloroparaffines of like chain length and benzol in the presence of aluminum chloride according to the known process; the mixture is treated with excess chlorosulfonic acid, and the resulting mixture of homologous alkylbenzolsulfochlorides is transformed with aqueous ammonia into a mixture of the corresponding amides. After separating out the unsulfonated parts by treating with steam at reduced pressure, a highly viscous oil is obtained. 12 parts by weight of this material and 12 parts by weight of acetyl cellulose are dissolved in 76 parts by weight of acetone. A lacquer is obtained which produces clear, transparent, non-sticky and firmly adhering films of highly waterproof character.

We claim:
1. A composition of matter comprising acetyl cellulose and as a plasticizer therefor an alkylbenzol-sulfamide whose alkyl group is bound to the benzol ring and contains 6–16 carbon atoms.
2. A composition of matter comprising about equal parts of acetyl cellulose and as a plasticizer therefor an alkyl-benzol-sulfamide whose alkyl group is bound to the benzol ring and contains 6–16 carbon atoms.

References Cited in the file of this patent

UNITED STATES PATENTS

| | | |
|---|---|---|
| 1,041,113 | Lindsay | Oct. 15, 1912 |
| 1,188,797 | Lindsay | June 27, 1916 |
| 1,229,486 | Lindsay | June 12, 1917 |
| 2,132,884 | Smith | Oct. 11, 1938 |
| 2,341,614 | Hentrick | Feb. 15, 1944 |
| 2,349,912 | Orthner | May 30, 1944 |
| 2,361,188 | Fox | Oct. 24, 1944 |

FOREIGN PATENTS

| | | |
|---|---|---|
| 520,162 | Great Britain | Apr. 16, 1940 |